(12) United States Patent  
Fukada

(10) Patent No.: US 8,782,455 B2  
(45) Date of Patent: Jul. 15, 2014

(54) IMAGE PROCESSING APPARATUS, CONTROL METHOD THEREFOR, AND STORAGE MEDIUM STORING CONTROL PROGRAM THEREFOR

(75) Inventor: Hiroshi Fukada, Fuchu (JP)

(73) Assignee: Canon Kabushiki Kaisha (JP)

( * ) Notice: Subject to any disclaimer, the term of this patent is extended or adjusted under 35 U.S.C. 154(b) by 207 days.

(21) Appl. No.: 13/410,412

(22) Filed: Mar. 2, 2012

(65) Prior Publication Data

US 2012/0229840 A1  Sep. 13, 2012

(30) Foreign Application Priority Data

Mar. 8, 2011 (JP) ................................ 2011-050038

(51) Int. Cl.  
*G06F 1/32* (2006.01)

(52) U.S. Cl.  
USPC ........... 713/323; 713/300; 713/310; 713/320; 713/321; 713/322; 713/324; 713/330; 713/340; 358/1.14

(58) Field of Classification Search  
USPC ................. 713/300, 310, 320–324, 330, 340; 358/1.14  
See application file for complete search history.

(56) References Cited

U.S. PATENT DOCUMENTS

| 8,527,790 | B2 * | 9/2013 | Nakahara et al. | 713/320 |
| 8,599,412 | B2 * | 12/2013 | Narushima et al. | 358/1.15 |
| 8,631,263 | B2 * | 1/2014 | Okuzono | 713/324 |
| 2009/0276650 | A1 * | 11/2009 | Kuroda et al. | 713/320 |
| 2010/0332885 | A1 * | 12/2010 | Okuzono | 713/324 |
| 2012/0002236 | A1 * | 1/2012 | Ebisui | 358/1.15 |

FOREIGN PATENT DOCUMENTS

JP  2005-309016 A  11/2005

* cited by examiner

*Primary Examiner* — M Elamin  
(74) *Attorney, Agent, or Firm* — Rossi, Kimms & McDowell LLP

(57) ABSTRACT

An image processing apparatus, which is capable of preventing increase in power consumption and operating normally in a first electric power mode even when returning to the first electric power mode from a second electric power mode by an unknown return factor. A storage unit stores a destination setting of the image processing apparatus. A shift unit shifts the apparatus from the second electric power mode to the first electric power mode, when a shift factor is detected in the second electric power mode. A set unit sets a re-shift time for re-shifting the apparatus from the first electric power mode to the second electric power mode, according to the destination setting. A re-shift unit re-shifts the apparatus from the first electric power mode to the second electric power mode, when a predetermined event does not occur in the re-shift time in the first electric power mode.

8 Claims, 8 Drawing Sheets

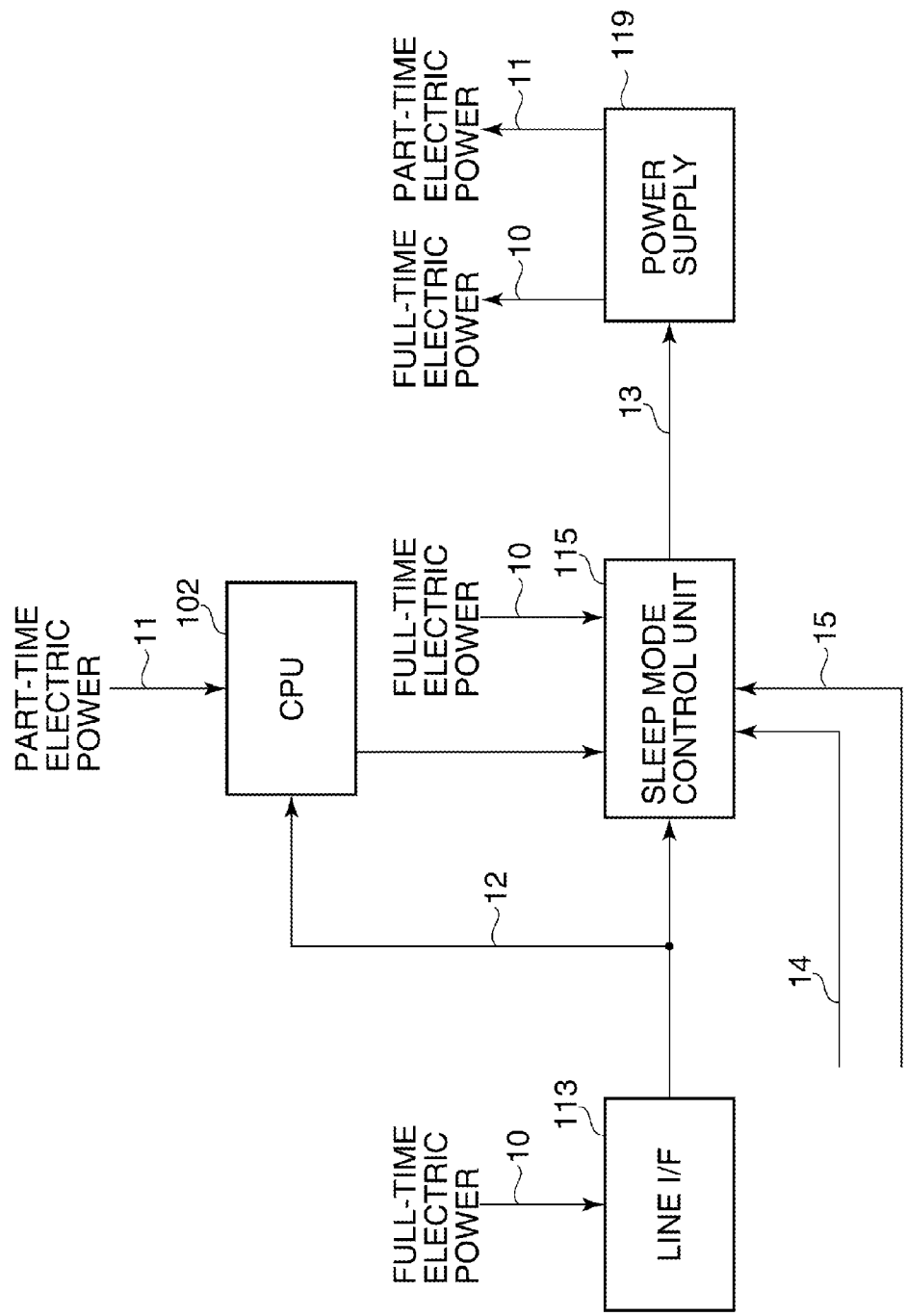

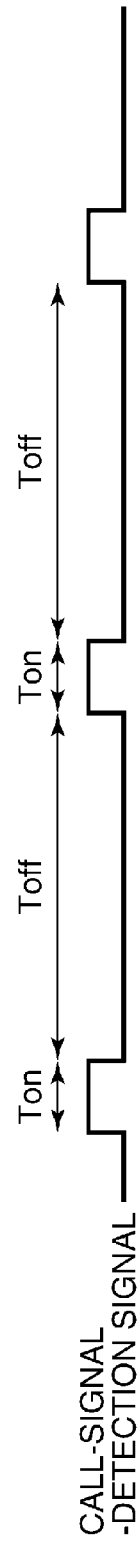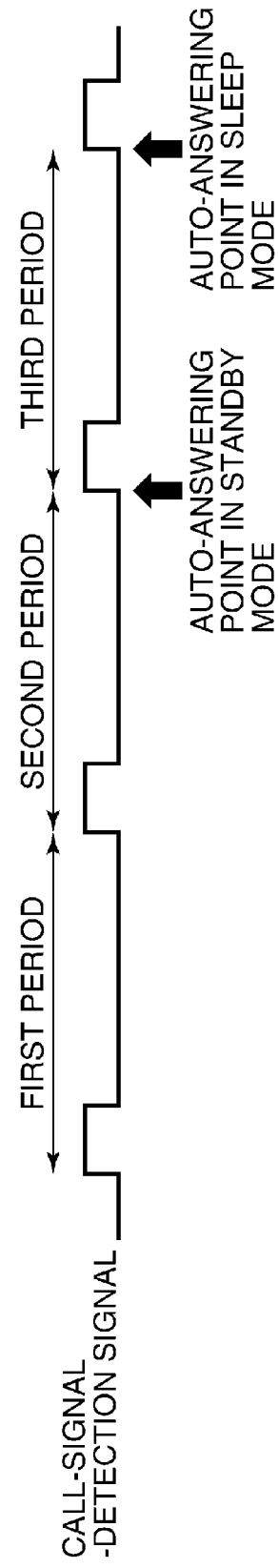

IMAGE PROCESSING APPARATUS, CONTROL METHOD THEREFOR, AND STORAGE MEDIUM STORING CONTROL PROGRAM THEREFOR

BACKGROUND OF THE INVENTION

1. Field of the Invention

The present invention relates to an image processing apparatus, a control method therefor, and a storage medium storing a control program therefor. Particularly, the present invention relates to a sleep mode control for the image processing apparatus.

2. Description of the Related Art

Conventionally, a multifunctional peripheral device (referred to as an MFP below) that has a facsimile function, a printer function, a copy function, etc. is known as an image processing apparatus. There are some MFP's that are provided with a sleep mode for power saving. This sleep mode reduces power consumption rather than a standby mode. In the sleep mode, the power supply to a part of hardware may be cut off.

Generally, a shift condition needs to be satisfied when an MFP shifts to the sleep mode from the standby mode. For example, the shift condition is satisfied when a setting operation, an operational request from an external host connected via a LAN or USB, and an internal factor of the MFP, etc. do not occur during a predetermined time.

On the other hand, there are a plurality of return factors (release factors) for returning to the standby mode from the sleep mode. There is a mode control that changes the time for shifting to the sleep mode again from the standby mode according to the type of the return factor.

Here, when a release button is pushed in the sleep mode, an MFP releases the power saving and sets a transit time as a first time. Then, when the standby condition where a predetermined event does not occur continues over the first time after finishing the previous operation (a copy operation, for example), the MFP shifts to the sleep mode again. On the other hand, when an incoming call that is originated by a control apparatus is detected in the sleep mode in night, the MFP releases the sleep mode, and sets the transit time as s second time (second time<first time). When the standby condition where a predetermined event does not occur continues over the second time, the MFP shifts to the sleep mode again (see Japanese Laid-Open Patent Publication (Kokai) No. 2005-309016 (JP 2005-309016A)).

Incidentally, JP 2005-309016A does not take account of a case where a return factor is unknown when returning to the standby mode from the sleep mode. Here, an example where a call signal from a telephone line is used as a return factor in the facsimile function of the MFP will be described.

The call signal has a cadence (sequence) pattern of an ON signal and an OFF signal. In the sleep mode, the MFP returns to the standby mode from the sleep mode, when a call ON signal is detected. In this case, when a noise is mixed into the call signal under the effect of thunder etc. and a pulse-form call ON signal is inputted seemingly for example, the MFP cannot recognize an ON signal after returning to the standby mode. As a result, the MFP may fall into a state where the return factor from the sleep mode to the standby mode is unknown.

Then, even if the MFP returns to the standby mode from the sleep mode owing to an unknown return factor, when a new event does not occur over a definite time, the MFP shifts to the sleep mode from the standby mode again. However, the above-mentioned definite time is generally as long as tens of minutes from several minutes. Therefore, the total power consumption becomes large as compared with the case that re-shifts to the sleep mode immediately.

On the other hand, when the MFP is controlled so as to re-shift from the standby mode to the sleep mode in several seconds in order to reduce the total power consumption even if the return factor is unknown, the short re-shift time of several seconds may not allow a normal incoming operation by only repeating the return from the sleep mode and the re-shift to the sleep mode even when receiving a real call signal cadence pattern.

SUMMARY OF THE INVENTION

The present invention provides an image processing apparatus, a control method therefor, and a storage medium storing a control program therefor, which are capable of preventing increase in power consumption and operating normally in a first electric power mode even when returning to the first electric power mode from a second electric power mode with less power consumption than the first electric power mode by an unknown return factor.

Accordingly, a first aspect of the present invention provides an image processing apparatus that is provided with a first electric power mode and a second electric power mode with less power consumption than the first electric power mode, comprising a storage unit configured to store a destination setting of the image processing apparatus, a shift unit configured to shift the image processing apparatus from the second electric power mode to the first electric power mode, when a shift factor is detected in the second electric power mode, a set unit configured to set a re-shift time for re-shifting the image processing apparatus from the first electric power mode to the second electric power mode, according to the destination setting, and a re-shift unit configured to re-shift the image processing apparatus from the first electric power mode to the second electric power mode, when a predetermined event does not occur in the re-shift time in the first electric power mode.

Accordingly, a second aspect of the present invention provides a control method for an image processing apparatus that is provided with a first electric power mode and a second electric power mode with less power consumption than the first electric power mode, the control method comprising a storing step of storing a destination setting of the image processing apparatus, a shift step of shifting the image processing apparatus from the second electric power mode to the first electric power mode, when a shift factor is detected in the second electric power mode, a set step of setting a re-shift time for re-shifting the image processing apparatus from the first electric power mode to the second electric power mode, according to the destination setting, and a re-shift step of re-shifting the image processing apparatus from the first electric power mode to the second electric power mode, when a predetermined event does not occur in the re-shift time in the first electric power mode.

Accordingly, a third aspect of the present invention provides a non-transitory computer-readable storage medium storing a control program causing a computer to execute a control method for an image processing apparatus that is provided with a first electric power mode and a second electric power mode with less power consumption than the first electric power mode, the control method comprising a storing step of storing a destination setting of the image processing apparatus, a shift step of shifting the image processing apparatus from the second electric power mode to the first electric power mode, when a shift factor is detected in the second electric power mode, a set step of setting a re-shift time for re-shifting the image processing apparatus from the first electric power mode to the second electric power mode, according to the destination setting, and a re-shift step of re-shifting the image processing apparatus from the first electric power mode to the second electric power mode, when a predetermined event does not occur in the re-shift time in the first electric power mode.

According to the present invention, since the re-shift time is set according to the destination setting, the increase in power consumption is prevented and the normal operation in the first electric power mode can be ensured.

Further features of the present invention will become apparent from the following description of exemplary embodiments with reference to the attached drawings.

BRIEF DESCRIPTION OF THE DRAWINGS

FIG. 2 is a block diagram showing a section relevant to a sleep mode control in detail in the MFP shown in FIG. 1.

FIG. 3A is a timing chart showing output timing of the call-signal-detection signal described in FIG. 2 for describing a detection operation of a line I/F when receiving a call signal from a telephone line.

FIG. 3B is a timing chart showing output timing of the call-signal-detection signal described in FIG. 2 for describing the timing at which a CPU shown in FIG. 2 determines whether auto-answering in a facsimile function is available.

FIG. 5 is a flowchart showing a sleep mode shift process that is executed first after the power of the MFP shown in FIG. 1 is turned ON.

DESCRIPTION OF THE EMBODIMENTS

Hereafter, an example of an image processing apparatus according to an embodiment of the present invention will be described with reference to the attached drawings.

Figure 1:
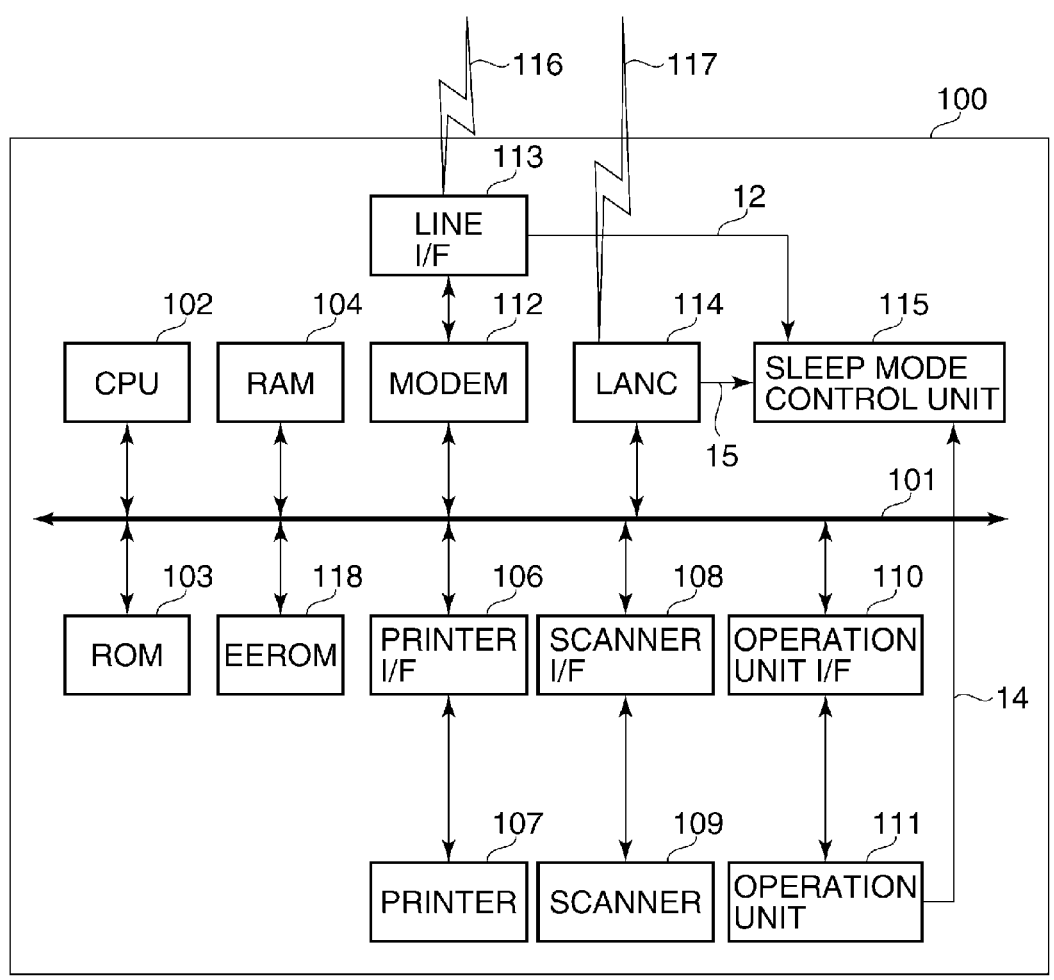
FIG. 1 is a block diagram schematically showing a configuration example of a multifunctional peripheral device (MFP) as one of an image processing apparatus according to a first embodiment of the present invention.

FIG. 1 is a block diagram schematically showing a configuration example of a multifunctional peripheral device (MFP) 100 as one of an image processing apparatus according to a first embodiment of the present invention.

The illustrated MFP 100 has a CPU 102 and this CPU 102 is connected to components, such as a ROM 103 and a RAM 104, via a system bus 101. The CPU 102 controls the entire system of the MFP 100 according to a system program stored in the ROM 103.

The RAM 104 is used as a system work memory of the CPU 102 and as an image memory for storing image data at the time of using a facsimile function, a printer function, or a copy function.

An EEROM (Electrically Erasable ROM) 118 is nonvolatile memory, and various setting parameters including the destination nation setting of the MFP 100 is stored in the EEROM 118. A printer 107 prints an image corresponding to image data on a sheet by the printer function.

The printer 107 is connected to the system bus 101 via a printer I/F (interface) 106. The printer I/F 106 converts the image data given from the system bus 101 into the data applicable to the printer 107, and outputs it to the printer 107.

A scanner 109 reads an image of an original at the time of a facsimile transmission or a copy operation, for example. This scanner 109 is connected to the system bus 101 via a scanner I/F 108. The image data read by the scanner 109 is converted into the data applicable to the system bus 101 by the scanner I/F 108.

An operation unit 111 is a user interface and is provided with a display unit and an input unit (that are not shown). The operation unit 111 is connected to the system bus 101 via an operation unit I/F 110. The operation unit I/F 110 outputs the image data for displaying to the display unit of the operation unit 111, and transmits the information that a user inputted through the input unit of the operation unit 111 to the CPU 102 via the system bus 101.

A modem 112 is modulator and demodulator used when transmitting and receiving the image data with the facsimile function. The modem 112 is connected to a telephone line 116 via a line I/F 113.

A LAN controller (LANC) 114 is connected to a LAN line 117, receives a print job etc. from a host on the LAN line 117, and transmits various data to the LAN line 117. A sleep mode control unit 115 controls re-shift to a sleep mode (a second electric power mode), and shift from the sleep mode.

The sleep mode control unit 115 makes the MFP 100 re-shift to the sleep mode according to an instruction from the CPU 102 in this example. The sleep mode control unit 115 receives a sleep mode return signal 14 from the operation unit 111. The sleep mode control unit 115 receives a sleep mode return signal 15 from the LANC 114. The sleep mode control unit 115 receives a call-signal-detection signal 12 mentioned later from the line I/F 113. Then, the sleep mode control unit 115 makes the MFP 100 shift to a standby mode (a first electric power mode) from the sleep mode in response to each of the sleep mode return signals 14, 15 and the call-signal-detection signal 12.

FIG. 2 is a block diagram showing a section relevant to the sleep mode control in detail in the MFP 100 shown in FIG. 1.

A power supply 119 receives AC input power and generates DC power used by the MFP 100. The DC power is divided into full-time electric power 10 and part-time electric power 11. The full-time electric power 10 is always outputted as long as the AC input power is supplied. On the other hand, the part-time electric power 11 stops outputting when the MFP 100 is in the sleep mode.

The part-time electric power 11 is supplied to the CPU 102. Since power consumption of the CPU 102 is comparatively large, the illustrated MFP 100 stops the power supply to the CPU 102 in the sleep mode so as to improve the power saving.

The full-time electric power 10 is supplied to the line I/F 113, and the line I/F 113 can detect a call signal received from the telephone line 116 even in the sleep mode. The full-time electric power 10 is supplied to the sleep mode control unit 115.

As shown in the drawings, the line I/F 113 gives the call-signal-detection signal 12 to the CPU 102 and to the sleep mode control unit 115. The sleep mode control unit 115 receives the call-signal-detection signal 12 as a sleep mode return factor (a shift factor).

The sleep mode return signals 14 and 15 are inputted into the sleep mode control unit 12 as mentioned above. Then, the sleep mode control unit 115 outputs a power source control signal 13 to the power supply 119. This power source control signal 13 is a signal for switching ON/OFF of the part-time electric power 11 in the power supply 119.

When the shift condition for shifting to the sleep mode from the standby mode is satisfied, the CPU 102 gives a shift signal to the sleep mode control unit 115. By this, the sleep mode control unit 115 gives the power source control signal 13 (referred to as an OFF control signal) that turns OFF the part-time electric power 11 to the power supply 119. On the other hand, when the call-signal-detection signal 12, the sleep mode return signal 14, or the sleep mode return signal 15 is received in the sleep mode, the sleep mode control unit 115 understands that a sleep mode return factor has occurred, and gives the power source control signal 13 (referred to as an ON control signal) that turns ON the part-time electric power 11 to the power supply 119.

Incidentally, mixture of a noise under an effect of thunder etc. into the telephone line 116 is unescapable. Then, since this noise is a very short pulse signal, the line I/F 113 may misdetect the noise as the call signal and may output the call-signal-detection signal 12 (referred to as an improper detection signal).

When the line I/F 113 outputs the improper detection signal (i.e., the call-signal-detection signal 12) while the MFP 100 is in the sleep mode, the sleep mode control unit 115 turns ON the part-time electric power 11, and returns the MFP 100 (the CPU 102 etc.) to the standby mode from the sleep mode. However, since the MFP 100 returns to the standby mode by the improper detection signal in this case, the return factor becomes unknown.

In the illustrated example, when a new event does not occur over a first time (for example, 5 seconds) under the condition where the return factor is unknown, the CPU 102 outputs the shift signal to the sleep mode control unit 115. By this, the sleep mode control unit 115 turns OFF the part-time electric power 11, shifts the MFP 100 (the CPU 102 etc.) to the sleep mode again, and controls the total power consumption.

FIG. 3A and FIG. 3B are timing charts that show the output timing of the call-signal-detection signal described in FIG. 2. Then, FIG. 3A is the timing chart showing a detection operation of the line I/F 113 when receiving a call signal from the telephone line 116. FIG. 3B is the timing chart showing a timing at which the CPU 102 shown in FIG. 2 determines whether auto-answering in the facsimile function is available.

In FIG. 3A, the call-signal-detection signal (i.e., a pulse signal) is ON in the time Ton and is OFF in the time Toff, repeats ON and OFF in a predetermined period. That is, the call-signal-detection signal is ON when the pulse form call signal is ON, and is OFF when the call signal is OFF. In other words, the call-signal-detection signal turns ON and OFF according to the cadence pattern of the call signal.

The cadence pattern of the call signal is beforehand defined in the telecommunication standard of each nation, and various patterns exist. A call signal is outputted to a telephone machine to which the private branch exchange is connected. Then, some private branch exchanges with original specifications output call signals of cadence patterns that are not defined in the telecommunication standard of installed nations.

For example, some private branch exchanges distributed in the United States output call signals of a special cadence pattern (Ton=0.2 second and Toff=9 seconds). The MFP 100 shown in FIG. 1 recognizes the call signal of the cadence pattern (Ton=0.2 second and Toff=9 seconds) in the United States destined setting while supposing that the MFP 100 concerned is connected to the private branch exchange.

As mentioned above, the CPU 102 of the MFP 100 is monitoring the call-signal-detection signal. When the MFP 100 receives a call signal in the standby mode, the CPU 102 measures the time Ton or the time Toff of the call-signal-detection signal 12. Then, the CPU 102 determines which of the cadence patterns (registered cadence patterns) that have been registered into the ROM 103 for the destination nation settings beforehand is coincident with (conforms to) the cadence pattern of the call-signal-detection signal.

When one of the registered cadence patterns conforms to the cadence pattern of the call-signal-detection signal, the CPU 102 gives effect to the call signal received by the line I/F 113. Then, the CPU 102 executes the auto-answering operation of the facsimile function automatically when detecting a second period of ON/OFF cadence pattern of a call-signal-detection signal as shown in FIG. 3B.

Here, it is assumed that the MFP 100 receives the very short call signal (Ton=0.2 second) from the above-mentioned US-destined private branch exchange in the sleep mode.

Although the MFP 100 returns from the sleep mode by detecting first ON of the call-signal-detection signal, when the electric power is supplied to the CPU 102 to be able to monitor the call-signal-detection signal, the call-signal-detection signal turns OFF and the sleep mode return factor becomes unknown.

When the sleep mode return factor is unknown, the illustrated MFP 100 that is set to be destined to a nation other than the United States keeps the standby mode in the first time (for example, 5 seconds) as mentioned above, but the MFP 100 that is set to be destined to the United States keeps the standby mode in a second time (for example, 11 seconds) longer than the first time.

Therefore, when the MFP 100 is set to be destined to the United States, the CPU 102 MFP 100 recognizes the call-signal-detection signal certainly when the call-signal-detection signal turn ON in the second period even for the special cadence pattern (Ton=0.2 second and Toff=9 seconds). As a result, the CPU 102 executes the auto-answering operation of the facsimile function automatically when detecting a third period of ON/OFF cadence pattern (i.e., the call-signal-detection signal).

Figure 4:
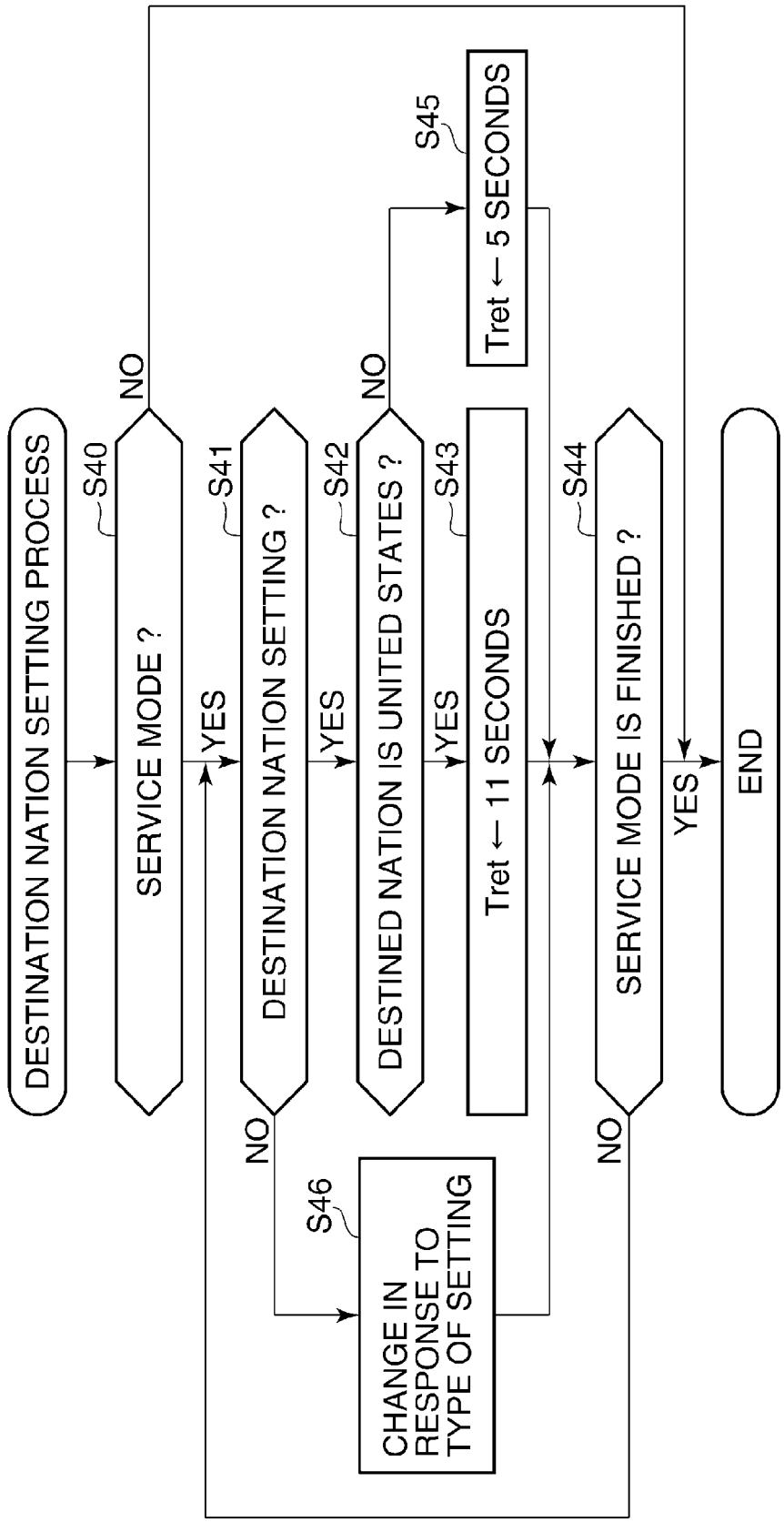
FIG. 4 is a flowchart showing a destination nation setting process in the MFP shown in FIG. 1.

FIG. 4 is a flowchart showing a destination nation setting process in the MFP 100 shown in FIG. 1.

The program stored in the ROM 103 supports the world-wide use and when the destination nation setting is changed, the MFP 100 is controlled according to the telecommunication standard of the destination nation concerned.

When a user gives a certain operation to the input unit of the operation unit 111, the CPU 102 shifts into a service mode. This service mode is provided in order to perform various setting operations in a factory or various setting operations by a serviceman.

When the destination nation setting process starts, the CPU 102 determines whether the MFP 100 is in the service mode (step S40). When the MFP 100 is not in the service mode (NO in the step S40), the CPU 102 finishes the process.

On the other hand, the MFP 100 is in the service mode (YES in the step S40), the CPU 102 determines whether a type of a setting operation is a destination nation setting (step S41). The type of the setting operation is the destination nation setting (YES in the step S41), the CPU 102 determines whether the destined nation by the setting operation is the United States (step S42).

When the destined nation is the United States (YES in the step S42), the CPU 102 changes a Tret parameter to the second time (for example, 11 seconds) in step S43. Then, the CPU 102 saves the Tret parameter (the second Tres parameter) concerned and the destination nation setting into the EEROM 118. This setting is held even if the power of the MFP 100 is cut off.

Subsequently, the CPU determines whether the service mode is finished by the setting operation (step S44). When it is determined that the service mode is not finished (NO in the step S44), the CPU 102 returns the process to the step S41, and determines whether the setting operation is the destination nation setting. On the other hand, when it is determined that the service mode has been finished (YES in the step S44), the CPU 102 finishes the process.

In the step S42, when the destined nation is not the United States (NO in the step S42), the CPU 102 changes the Tret parameter to the first time (for example, 5 seconds) shorter than the second time (step S45). Then, the CPU 102 saves the Tret parameter (the first Tres parameter) concerned and the destination nation setting into the EEROM 118. Then, the CPU 102 shifts to the process in step S44.

When it is determined that the setting operation is not the destination nation setting in the step S41, the CPU 102 changes the setting of the MFP 100 according to the type of setting other than the destination nation setting by the setting operation (step S46). Then, the CPU 102 shifts to the process in step S44.

The above-mentioned first and second times, i.e., the first and second Tres parameters, are set times, respectively.

Figure 5:
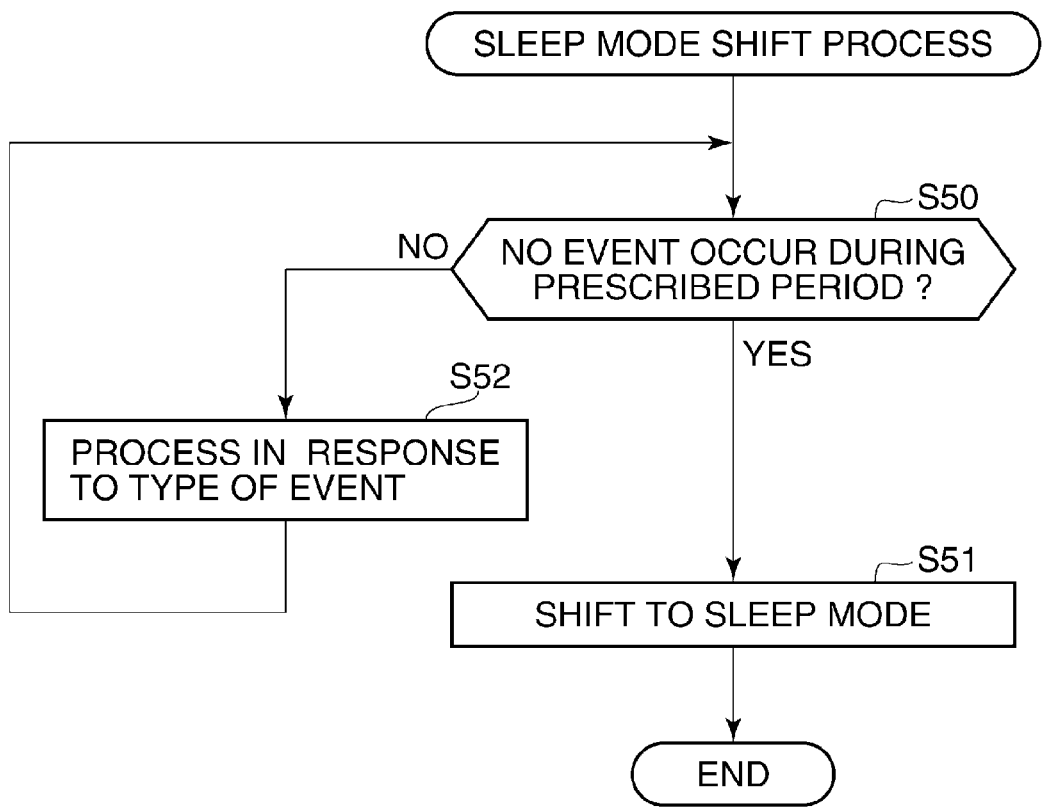

FIG. 5 is a flowchart showing a sleep mode shift process that is executed first after the power of the MFP 100 shown in FIG. 1 is turned ON.

It is assumed that the MFP 100 is in the standby mode. The CPU 102 checks whether an event occurs during the prescribed period defined beforehand (step S50). Here, an event is an operation of the operation unit 111, an operation request from a host connected via a LAN or a USB, or an internal factor of the MFP 100, etc., for example. The prescribed period is 10 minutes from the last end of event processing, for example.

When no event occurs during the prescribed period (YES in the step S50), the CPU 102 sends a shift signal to the sleep mode control unit 115 as mentioned above to turn OFF the part-time electric power 11. By this, the CPU 102 shifts the MFP 100 to the sleep mode (step S51). Then, the CPU 102 finishes the process.

On the other hand, when an event occurs during the prescribed period (NO in the step S50), the CPU 102 performs the process in response to the type of the event (step S52). Then, the CPU 102 returns the process to the step S50.

Figure 6:
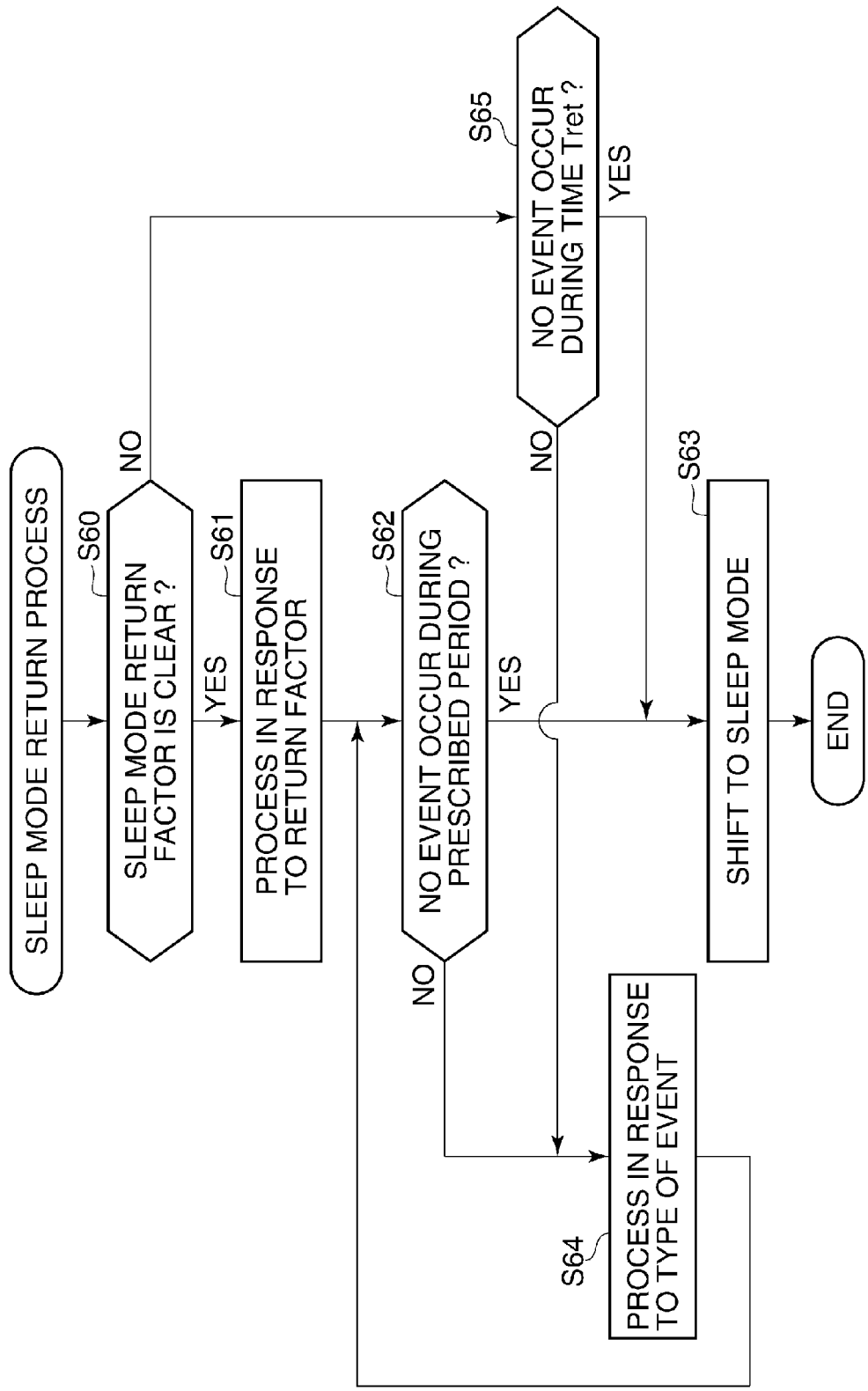
FIG. 6 is a flowchart showing a sleep mode return process in the MFP shown in FIG. 1.

FIG. 6 is a flowchart showing a sleep mode return process in the MFP 100 shown in FIG. 1.

It is assumed that the MFP 100 is in the sleep mode. As described in relation to FIG. 2, when a return factor occurs, the sleep mode control unit 115 turns ON the part-time electric power 11. This supplies the electric power to the CPU 102.

In this case, as described in FIG. 2, even when the ON time Ton of the call-signal-detection signal is very short, the sleep control unit 115 turns ON the part-time electric power 11. That is, the MFP 100 returns to the standby mode from the sleep mode.

In this case, when the electric power is supplied to the CPU 102 and the CPU 102 starts the operation, the CPU 102 cannot specify a sleep mode return factor because the call-signal-detection signal becomes OFF as mentioned above.

Therefore, when the MFP 100 returns to the standby mode from the sleep mode, the CPU 102 determines whether the sleep mode return factor is clear (step S60). When it is determined that the return factor is clear (YES in the step S60), the CPU 102 executes the process in response to the return factor (step S61). For example, if the return factor is the print job received via the LAN line 117, the CPU 102 prints by controlling the printer 107 via the printer I/F 106.

Subsequently, the CPU determines whether an event occurs during the above mentioned prescribed period (step S62). When no event occurs during the prescribed period (YES in the step S62), the CPU 102 sends a shift signal to the sleep mode control unit 115 to turn OFF the part-time electric power 11. By this, the CPU 102 shifts the MFP 100 to the sleep mode (step S63). Then, the CPU 102 finishes the process.

On the other hand, when an event occurs during the prescribed period (NO in the step S62), the CPU 102 performs the process in response to the event (step S64). Then, the CPU 102 returns the process to the step S62.

In step S60, when it is determined that the return factor is not clear (NO in the step S60), the CPU 102 reads the Tret parameter stored in the EEROM 118. In this case, when the destination nation setting is the United States, the CPU 102 reads the second Tret parameter (11 seconds). When the destination nation setting is a nation other than the United States, the CPU 102 reads the first Tret parameter (5 seconds).

Subsequently, the CPU 102 determines whether an event occurred during the time (Tres time) specified by the read Tres parameter (step S65). When an event does not occur during the Tres time (YES in the step S65), the CPU 102 proceeds with the process to the step S63. On the other hand, when an event occurs during the Tres time (NO in the step S65), the CPU 102 proceeds with the process to the step S64.

Thus, in the first embodiment, when the MFP 100 is set to be destined for the United States, even if the call-signal-detection signal is the special signal (Ton=0.2 second and Toff=9 seconds, for example), the CPU 102 ensures the auto-answering of the facsimile function.

Since the MFP 10C that is set to be destined for a nation other than the United States is not necessary to respond to the above-mentioned special call-signal-detection signal, a re-shift time to the sleep mode (a sleep mode re-shift time) is shortened compared with the United States destined setting when the sleep mode return factor is unknown. This can reduce the total power consumption.

Subsequently, one example of an MFP according to a second embodiment of the present invention will be described. It should be noted that the configuration of the MFP of the second embodiment is the same as the configuration shown in FIG. 1 and FIG. 2.

Figure 7:
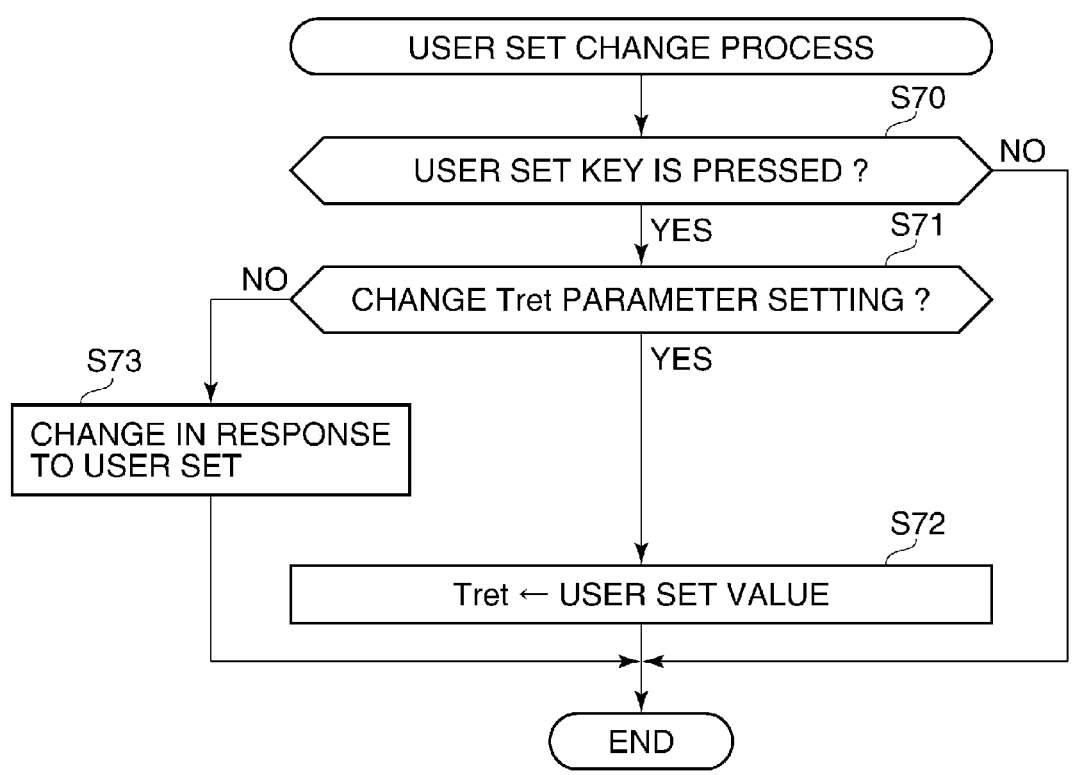
FIG. 7 is a flowchart showing a user set change process in an MFP according to a second embodiment of the present invention.

FIG. 7 is a flowchart showing a user set change process in the MFP 100 according to the second embodiment of the present invention.

The input unit of the operation unit 111 shown in FIG. 1 is equipped with a user set key (not shown). The CPU 102 is checking whether the user set key is pressed (step S70). When the user set key is not pressed (NO in, the step S70), the CPU 102 finishes the process.

On the other hand, when the user set key is pressed (YES in the step S70), the CPU 102 determines whether the Tret parameter setting change is designated among user set items via the operation unit 111 (step S71). When it is determined that the Tret parameter setting change has been designated (YES in the step S71), the CPU 102 rewrites the Tres parameter stored in the EEROM 118 according to the Tret parameter (i.e., a time) designated by the input operation via the operation unit 111 (step S72). In this case, the CPU 102 saves the update history to the EEROM 118. Then, the CPU 102 finishes the process.

As mentioned above, the EEROM 118 stores the second Tres parameter for the United States destined setting and stores the first Tres parameter for the destination nation setting other than the United States. However, even in the United States, the general call signal cadence that has the regular call-signal-detection signal (Ton=2 seconds and Toff=5 seconds) is used in almost every case in a usual installed environment. In such a case, the second Tres parameter (i.e., 11 seconds) is changed suitably by the user set change to reduce the total power consumption. That is; the second Tret parameter can be arbitrarily shortened by the user set change.

When it is determined that the Tret parameter setting change is not designated (NO in the step S71), the CPU 102 changes the setting in response to the user set (contents of change) selected from among the user set items via the operation unit 111 (step S73). Then; the CPU 102 finishes the process.

Thus, in the second embodiment, the second Tres parameter that is a special destination nation setting can be changed if needed for a user. That is, the second Tres parameter can be arbitrarily changed in response to the type of the telephone line. As a result, the sleep mode re-shift time when the sleep mode return factor is unknown is optimized, and the total power consumption can be reduced.

Next, one example of an MFP according to a third embodiment of the present invention will be described. It should be noted that the configuration of the MFP of the third embodiment is the same as the configuration shown in FIG. 1 and FIG. 3.

Figure 8:
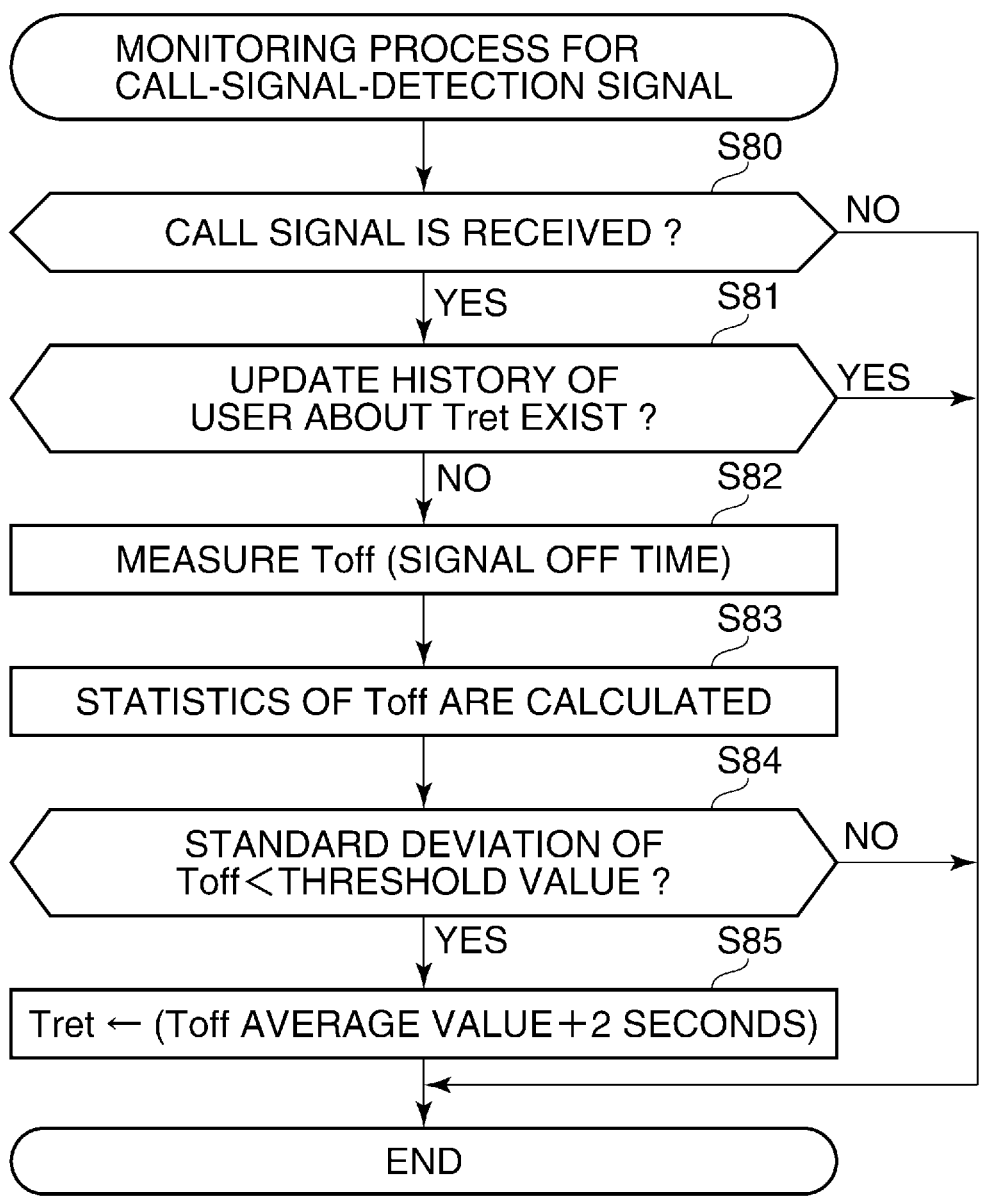
FIG. 8 is a flowchart showing a monitoring process for a call-signal-detection signal in an MFP according to a third embodiment of the present invention.

FIG. 8 is a flowchart showing a monitoring process for a call-signal-detection signal in the MFP 100 according to the third embodiment of the present invention. It should be noted that the process shown in FIG. 8 is executed when the electric power is supplied to the MFP so that a normal operation is possible (the standby mode etc.).

The CPU 102 determines whether the call-signal-detection signal is received. That is, the CPU 102 determines whether a call signal is received from the telephone line 116 (step S80). When a call signal is not received (NO in the step S80), the CPU 102 finishes the process.

On the other hand, whenever a call signal is received (YES in the step S80), the CPU 102 searches the EEROM 118 to determine whether there is the update history (change history) of the user about the Tret parameter (i.e., the second Tres parameter) in step S81. When there is the update history (YES in the step S81), the CPU 102 finishes the process.

When there is no change history (NO in the step S81), the CPU 102 measures the OFF time Toff of the call-signal-detection signal (i.e., the period of the call-signal-detection signal) in step S82. Then, the CPU 102 saves the measured OFF time Toff as a pattern history to the EEROM 118.

Subsequently, the CPU 102 calculates statistics about the OFF time Toff stored in the EEROM 118 (step S83). Here, the statistics mean an average value and a standard deviation of the OFF times Toff of a predetermined number (for example, 10 times), for example.

Then, the CPU 101 determines whether the standard deviation less than a predetermined threshold value (step S84). Here, when the standard deviation of the OFF times Toff for 10 times is less than the predetermined threshold value, it can be determined that the cadence pattern of the call signal received from the telephone line 116 is almost constant.

When the standard deviation is not less than the predetermined threshold value (NO in the step S84), the CPU 102 finishes the process. On the other hand, when the standard deviation is less than the predetermined threshold value (YES in the step S84), the CPU 102 rewrites the Tret parameter (the second Tres parameter, here) stored in the EEROM 118 as a new value (updated Tres parameter) that is obtained by adding a predetermined time (2 seconds, for example) to the average value of the OFF times Toff. Then, the CPU 102 finishes the process.

Thus, since the Tret parameter is automatically revised in response to the type of the telephone line in the third embodiment, the sleep mode re-shift time is optimized and the total power consumption can be reduced even if the sleep mode return factor is unknown.

Since the Tret parameter is revised using the standard deviation, the Tret parameter is changed in response to the cadence pattern, and the Tret parameter is not revised again after the setting change, when the cadence pattern of the call signal is clear, for example.

As it is clear from the above-mentioned description, the line I/F 113 functions as a detection unit and the sleep mode control unit 115 functions as a return unit in FIG. 1. The CPU 102 functions as a change unit and a history acquisition unit. Although the above-mentioned embodiments described the MFP that is one of the image processing apparatuses, the present invention is similarly applicable to another image processing apparatus as long as the image processing apparatus has the facsimile function and receives a call signal via a telephone line.

Although the embodiments of the invention have been described, the present invention is not limited to the above-mentioned embodiments, the present invention includes various modifications as long as the concept of the invention is not deviated.

For example, the functions of the above mentioned embodiments may be achieved as a control method that is executed by the image processing apparatus. Moreover, the functions of the above mentioned embodiments may be achieved as a control program that is executed by a computer with which the image processing apparatus is provided. It should be noted that the control program is recorded into a computer-readable storage medium, for example.

In this case, each of the control method and the control program has a detection step, a return step, and a change step at least.

OTHER EMBODIMENTS

Aspects of the present invention can also be realized by a computer of a system or apparatus (or devices such as a CPU or MPU) that reads out and executes a program recorded on a memory device to perform the functions of the above-described embodiment(s), and by a method, the steps of which are performed by a computer of a system or apparatus by, for example, reading out and executing a program recorded on a memory device to perform the functions of the above-described embodiment(s). For this purpose, the program is provided to the computer for example via a network or from a recording medium of various types serving as the memory device (e.g., computer-readable medium).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2011-050038, filed on Mar. 8, 2011, which is hereby incorporated by reference herein in its entirety.

What is claimed is:

1. An image processing apparatus that is provided with a first electric power mode and a second electric power mode with less power consumption than the first electric power mode, comprising:
   a storage unit configured to store a destination setting of the image processing apparatus;
   a shift unit configured to shift the image processing apparatus from the second electric power mode to the first electric power mode, when a shift factor is detected in the second electric power mode;
   a set unit configured to set a re-shift time for re-shifting the image processing apparatus from the first electric power mode to the second electric power mode, according to the destination setting; and
   a re-shift unit configured to re-shift the image processing apparatus from the first electric power mode to the second electric power mode, when a predetermined event does not occur in the re-shift time in the first electric power mode.

2. The image processing apparatus according to claim 1, further comprising a user set unit configured to set the re-shift time by a user.

3. The image processing apparatus according to claim 1, wherein the shift factor is a pulse signal that repeats ON and OFF, and the re-shift times are defined in response to ON/OFF periods of the pulse signal, and
   wherein said set unit selects the re-shift time that is longer than the ON/OFF period.

4. The image processing apparatus according to claim 3, wherein the pulse signal is a call signal received via a telephone line.

5. The image processing apparatus according to claim 3, further comprising a history acquisition unit configured to acquire the period of the pulse signal as a pattern history whenever the shift factor occurs,
   wherein said set unit sets the re-shift time according to the pattern history.

6. The image processing apparatus according to claim 5, wherein said history acquisition unit measures an OFF time of each of the pulse signals, calculates an average value and a standard deviation of the off times of a predetermined number, and sets the re-shift time to a time that is obtained by adding a predetermined time to the average value.

7. A control method for an image processing apparatus that is provided with a first electric power mode and a second electric power mode with less power consumption than the first electric power mode, the control method comprising:
   a storing step of storing a destination setting of the image processing apparatus;
   a shift step of shifting the image processing apparatus from the second electric power mode to the first electric power mode, when a shift factor is detected in the second electric power mode;
   a set step of setting a re-shift time for re-shifting the image processing apparatus from the first electric power mode to the second electric power mode, according to the destination setting; and
   a re-shift step of re-shifting the image processing apparatus from the first electric power mode to the second electric power mode, when a predetermined event does not occur in the re-shift time in the first electric power mode;
   wherein at least one of the storing step, the shift step, the set step and the re-shift step is implemented with a processor and memory.

8. A non-transitory computer-readable storage medium storing a control program causing a computer to execute a control method for an image processing apparatus that is provided with a first electric power mode and a second electric power mode with less power consumption than the first electric power mode, the control method comprising:
   a storing step of storing a destination setting of the image processing apparatus;
   a shift step of shifting the image processing apparatus from the second electric power mode to the first electric power mode, when a shift factor is detected in the second electric power mode;
   a set step of setting a re-shift time for re-shifting the image processing apparatus from the first electric power mode to the second electric power mode, according to the destination setting; and
   a re-shift step of re-shifting the image processing apparatus from the first electric power mode to the second electric power mode, when a predetermined event does not occur in the re-shift time in the first electric power mode.

* * * * *